US009132583B2

(12) United States Patent
Bogenrieder et al.

(10) Patent No.: US 9,132,583 B2
(45) Date of Patent: Sep. 15, 2015

(54) METHOD AND DEVICE FOR PRODUCING A VALVE UNIT FOR AN AIRBAG

(75) Inventors: Ralf Bogenrieder, Stuttgart (DE); Christian Burczyk, Stuttgart (DE); Andreas Hirth, Dielheim (DE); Lutz Quarg, Boeblingen (DE); Friedrich Reiter, Sindelfingen (DE)

(73) Assignee: Daimler AG, Stuttgart (DE)

(*) Notice: Subject to any disclaimer, the term of this patent is extended or adjusted under 35 U.S.C. 154(b) by 271 days.

(21) Appl. No.: 13/821,019

(22) PCT Filed: Sep. 3, 2011

(86) PCT No.: PCT/EP2011/004445
§ 371 (c)(1), (2), (4) Date: Mar. 26, 2013

(87) PCT Pub. No.: WO2012/031724
PCT Pub. Date: Mar. 15, 2012

(65) Prior Publication Data

US 2013/0180648 A1 Jul. 18, 2013

(30) Foreign Application Priority Data

Sep. 7, 2010 (DE) ........................ 10 2010 044 525

(51) Int. Cl.

| | |
|---|---|
| ***B29C 51/10*** | (2006.01) |
| ***B29C 51/08*** | (2006.01) |
| ***B29C 51/14*** | (2006.01) |
| *B29L 9/00* | (2006.01) |
| *B29L 22/02* | (2006.01) |
| *B60R 21/231* | (2011.01) |

(52) U.S. Cl.
CPC ............... *B29C 51/08* (2013.01); *B29C 51/145* (2013.01); *B29C 51/10* (2013.01); *B29C 2791/006* (2013.01); *B29C 2793/009* (2013.01); *B29C 2793/0018* (2013.01); *B29L 2009/001* (2013.01); *B29L 2022/027* (2013.01); *B60R 2021/23115* (2013.01); *Y10T 156/1028* (2015.01)

(58) Field of Classification Search
None
See application file for complete search history.

(56) References Cited

U.S. PATENT DOCUMENTS

2011/0049846 A1 3/2011 Hirth et al.
2013/0049337 A1* 2/2013 Bogenrieder et al. ..... 280/743.1

FOREIGN PATENT DOCUMENTS

DE 10 2007 052 246 A1 5/2009
DE 102010007881 A1 * 8/2011

(Continued)

OTHER PUBLICATIONS

English translation of Chinese Office Action dated Jul. 16, 2014 (two (2) pages).
International Search Report with English translation dated Feb. 29, 2012 (four (4) sheets).

(Continued)

*Primary Examiner* — Barbara J Musser
(74) *Attorney, Agent, or Firm* — Crowell & Moring LLP

(57) ABSTRACT

A method for producing a valve device is provided. The airbag has at least one substantially air-permeable textile, fabric layer and with a film. The textile layer and the film are arranged in a deep-drawing tool with at least area-wise reciprocal overlapping. The film is deep-drawn in deep-drawing regions by the deep-drawing tool to form a plurality of depressions of the film. The textile layer is connected to the film in regions of the film differing from the deep-drawing regions by the deep-drawing tool.

9 Claims, 2 Drawing Sheets

(56) References Cited

FOREIGN PATENT DOCUMENTS

| | | | |
|---|---|---|---|
| EP | 1 736 298 | A1 | 12/2006 |
| JP | 56-142039 | A | 11/1981 |
| WO | WO 2006/133969 | A1 | 12/2006 |

OTHER PUBLICATIONS

German-language Written Opinion (PCT/ISA/237) (eight (8) sheets).

"Passive Adaptive Can Vent for Airbags", IP.com Journal, Mar. 21, 2007, pp. 1-7 (eight (8) sheets).

* cited by examiner

METHOD AND DEVICE FOR PRODUCING A VALVE UNIT FOR AN AIRBAG

BACKGROUND AND SUMMARY OF THE INVENTION

Exemplary embodiments of the present invention relate to a method and device for producing a valve device for an airbag.

German Patent Document No. DE 10 2007 052 246 A1 discloses an airbag for a motor car, having a supporting structure that can be moved from a storage position into a restraining position. The airbag further comprises a shell, by means of which a restraining volume of the airbag formed by the supporting structure is surrounded in its restraining position.

Depending upon the construction type, it is necessary for the restraining volume to fill particularly rapidly with, in particular, ambient air upon movement of the supporting structure into the restraining position in order to thus be able to receive and restrain occupants of the motor car particularly efficiently.

Exemplary embodiments of the present invention provide a method for producing a valve device for an airbag that facilitates the production of a cost-effective valve device, wherein the valve device facilitates advantageous filling of a restraining volume of the airbag with air.

A method according to the invention for producing a valve device for an airbag, having at least one substantially air-permeable textile layer, in particular a fabric layer, and having a film, comprises at least one step, in which the textile layer and the film are arranged reciprocally overlapping at least in areas in a deep-drawing tool.

Subsequently, in at least one further step the film is deep-drawn in deep-drawing regions by means of the deep-drawing tool, whereby a plurality of depressions of the film are formed. In addition the method according to the invention comprises at least one further step, in which the textile layer is connected to the film, in regions of the film differing from the deep-draw regions, by means of the deep-drawing tool. Due to the fact that the film is deep-drawn by means of the deep-drawing tool and also connected to the textile layer by means of the same deep-drawing tool, the method according to the invention can be carried out particularly favorably with regard to time and costs. This facilitates low production costs and thus low overall costs of the valve device and thus of the whole airbag.

The film and the textile layer are advantageously connected to each other at least substantially simultaneously with the deep-drawing of the film, whereby this keeps the production time and hence the production costs of the valve device particularly low.

In addition the valve device produced through the method according to the invention facilitates a particularly rapid flow of a medium, in particular air, through the valve device in a flow direction so that, for example, a restraining volume formed by a supporting structure of the airbag (which is also described as a framework structure) can fill particularly rapidly with the medium, in particular ambient air. In addition the valve device can at least substantially prevent a flow of the medium in a second flow direction contrary to the first flow direction so that the medium remains in the restraining volume at least substantially or can only flow as desired very slowly out of the restraining volume if a relatively high inner pressure builds up in the restraining volume, for example in case of an accident, due to the impact of an occupant against the supporting structure or the airbag. Such a high inner pressure would cause the medium, in particular the air, to flow out of the restraining volume in the second flow direction.

The valve device thus facilitates, for example, a particularly rapid movement, in particular unfolding, of the supporting structure from a storage position, in which the supporting structure is accommodated in a housing of the airbag, into a restraining position so that the supporting structure and possibly a shell surrounding the restraining volume in the restraining position can receive and restrain the occupant particularly efficiently. The valve device produced through the method according to the invention also guarantees a particularly good service life of the airbag so that it can thus protect occupant(s) particularly well from serious injuries.

It should be noted that the airbag can also comprise at least one air sack, which is to be filled with a medium, in particular air, and in which likewise the valve device produced through the method according to the invention can be used in order to facilitate a particularly rapid filling of the air sack with the medium so that the air sack can receive and restrain the occupant(s) particularly well.

The film of the valve device serves to at least substantially permit the flow of the medium through the valve device and thus the textile layer and corresponding regions of the film in the first flow direction and to at least substantially prevent the flow of the air in the second flow direction contrary to the first flow direction or correspondingly to allow a smaller air mass per time unit to flow through the valve device in the second flow direction than in contrast a higher air mass per time unit in the first flow direction through the valve device.

It is thereby facilitated, for example, that by deep-drawing, the depressions are formed as tubular valves that facilitate a flow of the film through these in the first flow direction. If the described high inner pressure in the restraining volume causes a flow of the air in the second flow direction, the tubular valves thus close (e.g., by coming come together), at least substantially, and prevent air from flowing out of the restraining volume at least substantially and slow down this flow correspondingly in the second flow direction. It is thereby understood that the film is at least substantially air-impermeable in other regions in which the depressions are not formed.

The textile layer of the valve device provides impact protection for the depressions formed, for example, as tubular valves so that they do not undesirably turn inside out when the air flows or tries to flow in the second flow direction, whereby this is at least substantially prevented by the closing tubular valves. By means of the valve device to be produced cost-effectively by means of the method according to the invention, a particularly advantageous valve functionality is thereby produced for the airbag.

The deep-drawing tool comprises, for example, cylindrical depressions whereby these depressions constitute negative counter contours in order to form the depressions as positive contours corresponding to the counter contours. The depressions of the deep-drawing tool respectively comprise at least one passage opening, in particular a borehole, whereby these are respectively arranged on a respective end face, in particular on a respective bottom, of the depressions of the deep-drawing tool. By means of these respective passage openings the depressions of the deep-drawing tool can be impacted with a pneumatic underpressure and thus at least substantially emptied so that the film for forming the depressions of the film can be sucked into the depressions of the deep-drawing tool and the film can thus be deep-drawn.

In order to deep-draw the film and to produce the valve device, the deep-drawing tool is advantageously initially covered with the film, on which the air-permeable textile layer is then laid for example as a supporting fabric.

The film and textile layer are thereby laid, for example, on a lower part of the tool. Subsequently the deep-drawing tool is closed by an upper part of the deep-drawing tool under high pressure, followed by the emptying of the depressions of the deep-drawing tool, so that the film is deep-drawn in a cup shape.

During and advantageously at least substantially simultaneously during the deep-drawing of the film, the connection of the film to the textile layer also takes place in regions of the film that are not or were not deep-drawn, thus between the at least substantially cylindrical depressions of the film that have already been formed, are formed during the connection or are formed following the connection. The film and the textile layer are connected, for example, by means of a bonding agent, mechanical pressure, and/or by heat, wherein, for example, the film is fused with the textile layer.

Further advantages, features and details of the invention ensue from the following description of preferred embodiments and by reference to the drawing. The features and feature combinations mentioned above in the description and the features and feature combinations mentioned below in the description of the figures and/or shown solely in the figures can be used not only in the respectively indicated combination but also in other combinations or alone without going outside of the scope of the invention.

BRIEF DESCRIPTION OF THE DRAWING FIGURES

DETAILED DESCRIPTION

Figures 1, 2:
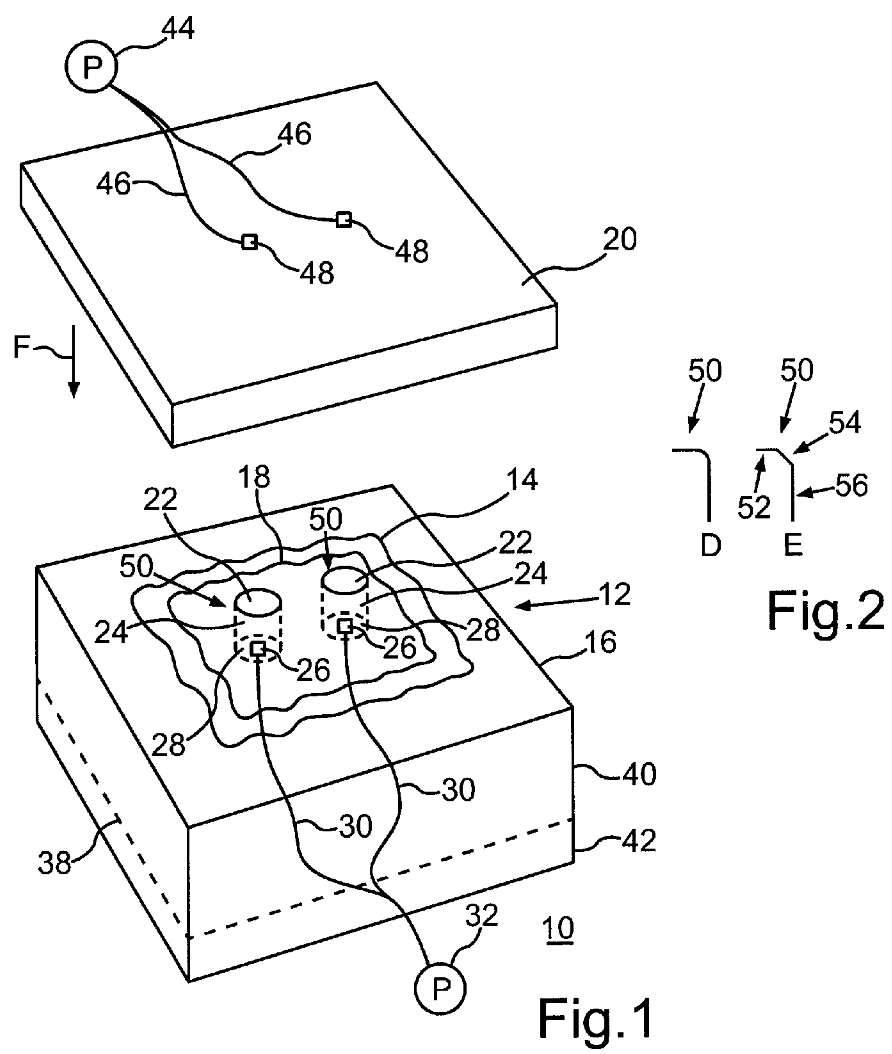
FIG. 1 shows, in a cut-out, a schematic perspective view of a deep-drawing tool for carrying out a method for producing a valve device for an airbag, wherein a supporting fabric is connected to a film and the film is deep-drawn to form tubular valves.
FIG. 2 shows, in a cut-out, two schematic sectional views of a sub-region of the deep-drawing tool according to FIG. 1.
Figure 3:
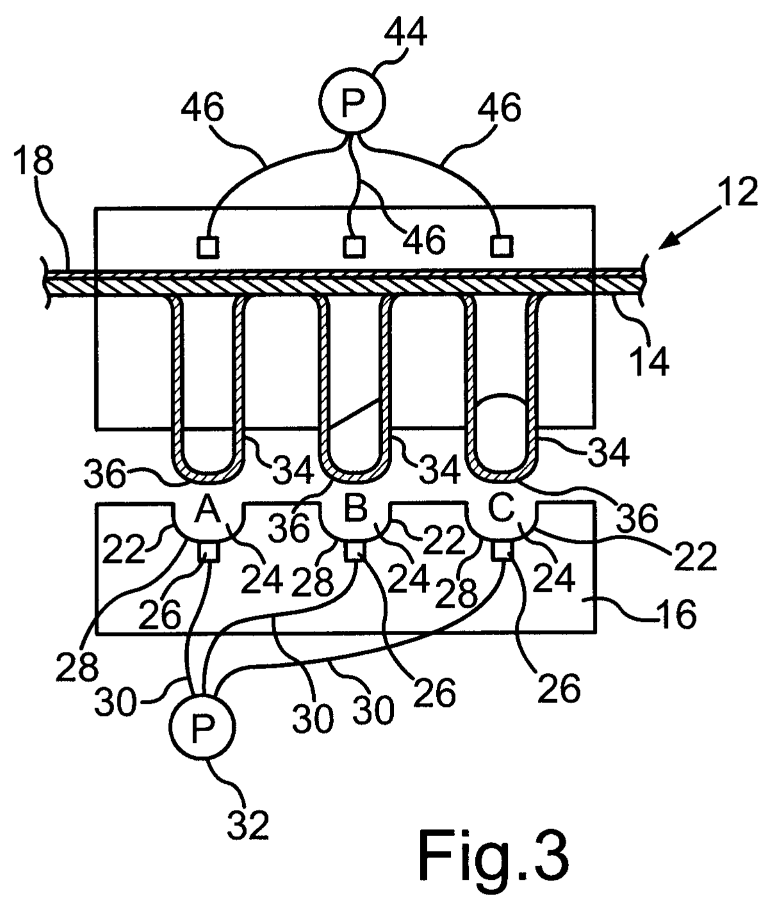
FIG. 3 shows, in a cut-out, a schematic sectional view of the deep-drawing tool according to FIGS. 1 and 2.

FIGS. 1 to 3 show a deep-drawing tool 10, by means of which a valve device 12 can be produced for an airbag of a motor car. In order to produce the valve device 12, initially a film 14 of the valve device 12 is placed on a lower part 16 of the deep-drawing tool 10. An air-permeable supporting fabric 18 of the valve device 12 is placed on the film 14 (which is initially air-impermeable), so that the film 14 and the supporting fabric 18 reciprocally overlap each other at least in areas. Subsequently the deep-drawing tool 10 is closed in that an upper part 20 of the deep-drawing tool 10 is applied under high pressure to the lower part 16, as indicated by a force arrow F in FIG. 1.

The deep-drawing tool 10 comprises depressions 22 that respectively have the shape of a straight circular cylinder and are formed in the lower part 16. The depressions 22 of the deep-drawing tool 10 comprise respective air chambers 24 that are connected via passage openings 26 in respective bottoms 28 of the depressions 22 and corresponding lines 30, indicated schematically in FIG. 1, with a vacuum pump 32. The vacuum pump 32 can suck away air in the air chambers 24 via the lines 30 and the passage openings 26 and thus at least substantially empty the air chambers 24 and hence the depressions 22 so that the film 14 is deep-drawn into the depressions 22 thus in a cup form.

Within the scope of this deep-drawing, a connection of the film 14 to the supporting fabric 18 also takes place in regions of the film 14 which have not or are not deep-drawn, thus between depressions 34 of the film 14 to be formed or which have been formed though the deep-drawing.

Through the at least substantial emptying of the air chambers 24 the film 14 is sucked in corresponding deep-drawing regions into the depressions 22 of the deep-drawing tool 10, so that the depressions 34 of the film 14 formed in that the film lay in deep-drawing regions against the depressions 22 of the deep-drawing tool 10, in such a way that the depressions 34 of the film represent positive contours that correspond to the depressions 22 of the deep-drawing tool 10 as corresponding negative contours. The connection between the film 14 and the supporting fabric 18 takes place for example by means of bonding agent, mechanical pressure, and/or heat.

Subsequently the deep-drawing tool 10 is opened so that the upper part 20 is removed from the lower part 16. Passage openings of the depressions 34 of the film 14 are then formed so that a medium, in particular air, can flow in a first flow direction not only through the air-permeable supporting fabric 18 but also through the film 14 via the depressions 34. In this way the depressions 34 are formed as tubular valves that facilitate the through-flow of the air through the valve device 12 in the first flow direction. The tubular valves prevent flowing of the air in a second flow direction contrary to the first flow direction at least substantially so that the tubular valves close at least substantially by coming together, for example, in the direction of the supporting fabric 18. The supporting fabric 18 hereby serves as an impact protection so that the depressions 34 and the tubular valves do not turn inside out and extend in an extension direction contrary to an extension direction shown in FIG. 3, whereby they would then facilitate a flow of the air in the second flow direction and would at least substantially prevent a flow of the air in the first flow direction, whereby this would constitute an undesirable valve functionality contrary to the previously described valve functionalities.

The passage openings of the depressions 34 are formed, for example, in such a way that a respective bottom 36 of the depressions 34 is cut away after the valve device 12 has been removed from the deep-drawing tool 10.

It can also be provided that the bottoms 36 are removed from the remaining film 14 while the film 14 and the valve device 12 are still in the deep-drawing tool 10. In this connection the lower part 14 is formed, for example, in two parts and comprises an upper part 40 and a lower part 42 so that a clearance 38 is created that facilitates a relative movement between the upper part 40 and the lower part 42. A corresponding section to separate the bottoms 36 then takes place within a gap that results when the two parts 40 and 42 are opened. Depending upon the position of the clearance 38, which thus constitutes a tool division of the deep-drawing tool 10, the extension, in particular the length, of the resulting tubular valves can be defined.

The tool division need not necessarily take place at least substantially in a planar manner, as shown in illustration A of FIG. 3. The provision of an inclined separating line according to illustration B in FIG. 3 is also possible. Through such inclined separating lines it can be ensured, for example, that the bottoms 36 of the depressions 34 are cut off in an inclined manner, whereby this may be advantageous for the valve function of the valve device 12. It is also possible to cut off or separate the bottoms 36 of the depressions 34 at least substantially in a curved manner, whereby this is shown by reference to illustration C in FIG. 3.

The separation of the bottoms 36 of the initially still closed depressions 34 can take place through different cutting methods. The use of at least one mechanical knife, of a laser, in particular a laser beam and/or a water jet is/are possible for example. The separation of the bottoms 36 with the valve device 12 arranged at least still on the lower part 16, in particular the deep-drawing tool 10, is characterised in that the depressions 34 are thereby still in a defined and fixed position. This defined position can advantageously also be supported by introducing overpressure 44 via corresponding lines 46 and passage openings 48 in the upper part 20 into the depressions 34 so that the depressions 34 are pressed against inner walls of the depressions 22 of the lower part 16 so that these lie against the inner walls and are thereby stabilized.

It is also possible to form the passage openings of the depressions 34 in such a way that the bottoms 36 are penetrated, in particular pierced after deep-drawing by means of a hot needle, so that a hole, is formed in the middle of the bottoms 34. By expanding the depressions 34 formed through the film 14, which are impacted, for example, with the overpressure 44, this hole expands, in particular advantageously so far that the diameter of the respective hole corresponds to the respective total diameters of the at least substantially cylindrical depressions 34 and the film 14 is formed in a tubular manner in the corresponding regions in order to form the tubular valves from the depressions 34.

FIG. 2 shows in illustrations D and E possible embodiments of edge regions 50 of the depressions 22 formed in the lower part 16. According to illustration D it is possible to form the edge region 50 in a curved manner with a radius without edges.

According to illustration E it is also possible to form the edge regions 50 with corners, wherein a first length region 52 is provided at an angle to a length region 54 connecting thereto. A further length region 56 is connected thereto, which is formed at a respective angle both to the first length region 52 and to the second length region 54. The edge region 50 thus comprises two edges or corners.

The deep-drawing tool 10 facilitates a production of the valve device 12 that is particularly favorable in terms of time and costs due to a small number of steps and an at least substantial parallelization of method steps. This also keeps the costs for the corresponding airbag, in which the valve device 12 is used, very low.

The valve device 12 further has a low packing volume and a low weight, which benefits a low packing volume and a low weight of the whole airbag. If the airbag or the corresponding supporting structure is in a storage position, from which the airbag or the supporting structure is moved into a restraining position for receiving and restraining an occupant, the supporting structure has only a very low construction space requirement.

In addition the valve device 12 has a very high functional integration, which keeps the number of parts, the construction space requirement, the weight and the costs of the valve device 12 and hence of the whole air bag at a very low level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for producing a valve device for an airbag, having at least a substantially air-permeable textile, fabric layer and a film, the method comprising the steps:

a) arranging the textile layer and the film to reciprocally overlap at least in areas in a deep-drawing tool;

b) deep-drawing, by the deep drawing tool, the film in deep-drawing regions to form a plurality of depressions of the film; and c) connecting, by the deep drawing tool, the textile layer to the film in regions of the film differing from the deep-drawing regions, wherein the depressions have respective passage openings.

2. The method according to claim 1, wherein the film is deep-drawn by pneumatic overpressure or underpressure.

3. The according to claim 1, wherein the textile layer and the film are connected to each other by bonding, being pressed together, or by heat.

4. The according to claim 1, wherein the passage openings are formed by separating respective bottom elements of the depressions, which bottom elements close the depressions, from the remaining film at least in some areas.

5. The according to claim 4, wherein the bottom elements are separated in a straight manner, an inclined manner, or is at least curved in areas.

6. The according to claim 4, wherein the bottom elements are separated by a knife, a laser or a water jet.

7. The according to claim 4, wherein piercing the respective bottom elements closing the depressions to form the passage openings.

8. The according to claim 4, wherein the depressions are provided with the respective passage openings while the textile layer and the film remain in the deep-drawing tool.

9. A deep-drawing tool for producing a valve device for an airbag, having at least a substantially air-permeable textile, fabric layer and a film, the tool comprising:

an area for arranging the textile layer and the film to reciprocally overlap at least in areas in a deep-drawing tool;

deep-drawing elements configured to deep draw the film in deep-drawing regions to form a plurality of depressions of the film; and an element configured to connect the textile layer to the film in regions of the film differing from the deep-drawing regions, wherein the depressions have respective passage openings.

* * * * *